US010560800B2

(12) United States Patent
DeLuca et al.

(10) Patent No.: US 10,560,800 B2
(45) Date of Patent: *Feb. 11, 2020

(54) MERGING PAYLOADS IN GEOFENCE CROWDED VENUES

(71) Applicant: International Business Machines Corporation, Armonk, NY (US)

(72) Inventors: Lisa Seacat DeLuca, Baltimore, MD (US); Jeremy A. Greenberger, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,919

(22) Filed: Jun. 19, 2018

(65) Prior Publication Data

US 2018/0302746 A1    Oct. 18, 2018

Related U.S. Application Data

(63) Continuation of application No. 15/243,480, filed on Aug. 22, 2016, now Pat. No. 10,034,130.

(51) Int. Cl.
*H04W 4/021* (2018.01)
*H04L 29/08* (2006.01)
*H04L 29/06* (2006.01)

(52) U.S. Cl.
CPC ............ *H04W 4/021* (2013.01); *H04L 67/10* (2013.01); *H04L 67/18* (2013.01); *H04L 69/22* (2013.01); *H04L 67/02* (2013.01)

(58) Field of Classification Search
CPC ......... H04W 4/02; H04W 4/12; H04W 4/027; H04W 4/0461
USPC .......................... 455/404.2, 456.1, 421, 453
See application file for complete search history.

(56) References Cited

U.S. PATENT DOCUMENTS

| 9,143,924 | B1 | 9/2015 | Abou-El-Ella et al. |
| 2015/0181384 | A1 | 6/2015 | Mayor et al. |
| 2016/0203522 | A1* | 7/2016 | Shiffert ................. H04W 76/14 705/14.58 |
| 2016/0244311 | A1* | 8/2016 | Burks .................. B67D 1/0888 |
| 2017/0041441 | A1 | 2/2017 | Barber et al. |

OTHER PUBLICATIONS

List of IBM Patents or Applications Treated as Related, 2018.

* cited by examiner

*Primary Examiner* — CongVan Tran
(74) *Attorney, Agent, or Firm* — Garg Law Firm, PLLC; Rakesh Garg; Isaac Gooshaw (57) ABSTRACT

A subset of geofences is selected from a set of geofences operating in an area, each geofence in the subset satisfying a primary consideration relative to at least one other geofence in the subset. In response to a first payload of a first geofence and a second payload of a second geofence satisfying a secondary consideration, a combined geofence definition is formed by combining a first definition of the first geofence with a second definition of the second geofence. At a data processing system distinct from a mobile device traveling in the area, the first payload is combined with the second payload to form a combined payload. The combined geofence definition and the combined payload are transmitted to the mobile device.

20 Claims, 5 Drawing Sheets

MERGING PAYLOADS IN GEOFENCE CROWDED VENUES

TECHNICAL FIELD

The present invention relates generally to a method, system, geofence and computer program product for managing targeted commercial data within a geofence. More particularly, the present invention relates to a method, system, and computer program product for merging payloads in geofence-crowded venues.

BACKGROUND

A wireless data processing system, wireless data communication device, or wireless computing platform is collectively and interchangeably referred to herein as a "mobile device". For example, many mobile devices not only allow the users to make voice calls, but also exchange messages and other data, access remote data processing systems, determine a user's location or activity, communicate with other mobile devices or data processing systems, or perform web-based interactions and other transactions.

Wearable devices are a category of mobile devices. A wearable device is essentially a mobile device, but has a form-factor that is suitable for wearing the device on a user's person.

A geofence is a perimeter of a closed area defined by one or more points, each point having a geographical coordinate in a three-dimensional (3D) geographical space. A geofence is also interchangeably referred to herein as simply a "fence".

As an example, the coordinates of a point on the geofence can be the latitude and longitude of the point. As another example, the coordinates of the point on the geofence can be defined relative to another point, using another system of measurements, or both.

For example, a geofence can be a circular area defined by a center point and a radius distance. As another example, a geofence can be a rectangular area defined by four corner points. Generally, a geofence can take the form of a regular or irregular polygon formed using straight lines, a circle, an ellipse, an irregular free-form shape formed using one or more curved lines, or some combination thereof.

Geofencing is extensively used in mobile communications. For example, many operators of Wi-Fi networks allow connection to their Wi-Fi access point only when a mobile device is within a geofence defined around the access point. As another example, retailers often define geofences around their stores to detect movement of patrons in and around their stores.

Operators also use Geofencing to perform targeted delivery or exchange of data—a payload—to or with mobile devices that are present within their geofence. For example, a retailer can send a payload, e.g., data of a coupon or advertisement, to a user on the user's mobile device, when the user is in or near the retailer's geofenced store.

A venue can have several geofences existing therein simultaneously. For example, a venue such as a shopping mall can have hundreds of stores, and consequently dozens if not hundreds of geofences defined and operating therein. A user's device can be bombarded with payload data in such geofence-crowded environments.

Furthermore, a user's device can presently track only a limited number of geofences at any given time. For example, an Android™ device can track up to one hundred geofences at a time and an iOS™ device can track up to twenty geofences at a time (iOS is a trademark of Cisco Systems, Inc. licensed to Apple Inc. in the United States and in other countries; Android is a trademark of Google Inc., in the United States and in other countries). Therefore, geofences in excess of a device's tracking capability may not be registered or detected by the device, their payload may be dropped or not received by the device, or both.

SUMMARY

The illustrative embodiments provide a method, system, and computer program product. An embodiment includes a method that selects, from a set of geofences operating in an area, a subset of geofences, each geofence in the subset satisfying a primary consideration relative to at least one other geofence in the subset. The embodiment forms a combined geofence definition, responsive to a first payload of a first geofence and a second payload of a second geofence satisfying a secondary consideration, by combining a first definition of the first geofence with a second definition of the second geofence. The embodiment combines, using a processor and a memory at a data processing system, the data processing system being distinct from a mobile device traveling in the area, and responsive to the forming the combined geofence definition, the first payload with the second payload to form a combined payload. The embodiment transmits, to the mobile device the combined geofence definition and the combined payload.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A mobile device can be located in a geographical area so as to be capable of receiving the information and payload of several geofences. The illustrative embodiments recognize that a significant challenge exists in areas that are crowded with geofences to determine which geofence information and the corresponding payload to send to a mobile device.

Presently, one method selects some geofences in preference to other geofences according to some preference rules. Such a method drops the payload of the unselected geofence, and the information of the geofence, e.g., the fence's definition, and the geofence's payload are not transmitted to the device.

Another presently method attempts to frequently determine the device's location by making computationally and power-wise expensive location queries to the device in order to determine the changes in the precise location of the device. The precise location is then used to again select only those few geofences that are closest to the device and can be handled within the limitations of the device. The other geofences that are still relevant but are not the closes are then dropped, and the device does not receive their payload data.

Thus, the illustrative embodiments recognize that when in a geofence-crowded environment, the payloads of at least some geofences are not available at a mobile device, which is otherwise located suitably relative to such geofences to receive such payloads. The illustrative embodiments used to describe the invention generally address and solve the above-described problems and other problems related to ensuring the delivery of a payload of a geofence to a suitably situated mobile device even if the device cannot detect the geofence due to crowding and device limitations.

An embodiment can be implemented as a software application. The application implementing an embodiment can be configured as a modification of an existing geofence payload delivery system, as a separate application that operates in conjunction with an existing geofence payload delivery system, a standalone application, or some combination thereof.

In some cases, the application implementing an embodiment may be implemented on a mobile device that traverses an area where a geofence is operating. For example, implementing an embodiment in a mobile device may be desirable when the mobile device can detect and receive information and payload of a number of geofences that is larger than the number of geofences operating on an area, but where it is desirable to reduce the number of geofences being handled by the device without losing the payload data for any of the detected geofences.

An embodiment detects that a device is operating in an area where a set of geofences are operating. The embodiment receives the definitions of a subset of geofences for which the device is suitably located. In other words, each geofence in the subset is a geofence which regards the device as being present within that geofence and is operating to deliver a payload to the device.

The embodiment uses a primary consideration to combine two or more geofences that are in the subset. As a non-limiting example, the primary consideration can be a distance between the geofences. In one embodiment, the distance between two geofences is the shortest distance between any point on one geofence and any point on the other geofence.

In another embodiment, the distance between two geofences is a distance between a point on or inside one geofence and another point on or inside the other geofence. For example, the distance may be between a location of a retail store situated relative to one geofence and a location of another retail store situated relative to the other geofence.

An embodiment determines the distance between two geofences. As a primary consideration for merging the two geofences, the embodiment determines whether the distance is less than a threshold distance. If the distance is less than the threshold distance, then the primary consideration for the merger is satisfied and the two geofences can be merged to form a single merged geofence. The actual merger is subject to one or more secondary considerations as well, which are described herein.

Any number of geofences can be merged to form a combined geofence. The combined geofence includes each of the individual geofences in their entirety. The combined geofence may, but need not necessarily include additional area, where the additional area is not a part of any of the individual geofences that have been merged.

When an embodiment forms a combined geofence, the embodiment also defines the combined geofence with a new definition that encompasses the definitions of each merged individual geofence. For example, some points on the combined geofence may be common between the combined geofence and one individual geofence, some other points on the combined geofence may be common between the combined geofence and a different individual geofence, and some points on the combined geofence may not be common between the combined geofence any individual geofence that is merged therein. Thus, the merging operation reduces the number of geofences that are defined for a mobile device.

Furthermore, once an embodiment determines that the primary consideration is satisfied for a merger, the embodiment further determines whether one or more secondary considerations are also satisfied for combining the payloads of the merged geofences. In other words, the embodiment determines whether the payloads of two individual geofences can be presented together to the device when the device is within the combined geofence.

If the individual geofences that satisfy the primary consideration include payloads that do not satisfy one or more secondary consideration, then the individual geofences cannot be merged into a combined geofence. Stated another way, for two individual geofences to be merged into a combined geofence, the two individual geofences must satisfy the primary consideration as well as all applicable secondary considerations.

As one non-limiting example, a secondary consideration may be combinability of a type of payload. For example, some payloads may be brand advertising, others may be coupons, still others may be up-sell or cross-sell offers, some may be informational, some others might be disclosures or warnings, and some may be surveys. Of course many other types of payloads can exist and are contemplated within the scope of the illustrative embodiments.

Accordingly, the example secondary consideration might provide that some types of payloads, such as disclaimers or warnings, may not be combined with any other types of payloads. Similarly, the example type-based secondary consideration may provide that some types of payloads may not be combined with other specific types of payloads, during certain days or times, for geofences operating at certain locations, when certain events are existing, and the like.

As another non-limiting example, a secondary consideration may be whether the individual geofences are along a common trajectory that is predicted for the mobile device. For example, the device may have previously visited the area and traversed through the area in a pattern of traversal, which can be established from the historical movement data of the device.

Accordingly, a trajectory of the device can be predicted to be the same or similar to the previous pattern through the area. According to the example secondary consideration, if two individual geofences that satisfy the primary consideration are both on the projected trajectory, then their payloads can be combined, otherwise not.

As another non-limiting example, a secondary consideration may be whether the individual geofences are from retailers or operators where the user of the mobile device has previously paused or stopped. Again, the pauses in previous traversals can be established from the historical movement data of the device.

Accordingly, the example secondary consideration may specify that if two individual geofences that satisfy the primary consideration are both related to operators where the user has paused before, then their payloads can be combined, otherwise not.

Similarly, another example secondary consideration may specify that only payloads that do not expire within a threshold amount of time from sending to the device may be combined.

Another example secondary consideration may provide that if an area of an individual geofence exceeds a threshold area, then the payload of that area should not be combined with payloads of other areas. Another example secondary consideration may provide that if the payloads of two individual geofences are combinable if the sizes of their individual geofences are similar within a tolerance value.

Another example secondary consideration may provide that if a shape of an individual geofence is irregular, the payload of that individual geofence should not be combined with the payload of another individual geofence. Conversely, another example secondary consideration may provide that if a shape of an individual geofence is a regular geometric polygon, the payload of that individual geofence should be combined with the payload of another individual geofence whose shape is also a regular geometric polygon of the same or a different type.

These examples of primary considerations and secondary considerations are not intended to be limiting. From this disclosure, those of ordinary skill in the art will be able to conceive many other primary considerations and secondary considerations and the same are contemplated within the scope of the illustrative embodiments.

Even when two individual geofences satisfy a primary consideration and satisfy all applicable secondary considerations, there may be exclusions or prohibitions. For example, an operator of an individual geofence can configure an exclusion of a particular payload, periods, or other attributes of the individual geofence to prevent combining the payload of that individual geofence with the payload of another individual geofence. Similarly, an embodiment can be configured to exclude certain payloads or individual geofences from combining, or prohibit certain combinations.

In some cases, a user can configure a mobile device with the user's preferences or prohibitions combinations with certain characteristics. When a device is configured with a preference or a prohibition, the device can provide the information about the preference or prohibition to an embodiment. The embodiment can then either create a combination of payloads according to a preference, or prevent a combination of payloads from forming according to a prohibition.

An embodiment is further optionally configured to analyze social data to determine whether to combine certain payloads. For example, given the availability of suitable information, the embodiment can identify the user or subscriber from the identifier of a mobile device. Once the identity of the user is known, the embodiment extracts information from a social media platform about a social network of the user. The embodiment then cross-references the identities of the individuals that are present in the social network of the user to determine whether any of those individuals have used a payload. For example, the embodiment determines whether a friend of the user has actually used a coupon at a checkout location of a retailer operator of a geofence.

When one or more individuals in the user's social network have used a payload, the embodiment determines that a likelihood exists that the user will want the same or similar payload. Thus, the social results of past payloads can be another example secondary consideration to be processed in a manner described herein.

Some secondary considerations may operate not for evaluating a combinability of payloads, or at least not for only that purpose, but to (also) evaluate how the combinable payloads should be combined. For example, one secondary consideration may specify a rule according to which relative priorities of the combinable payloads is computed. A result of such a secondary consideration would be a determination as to which payload is received or presented first at the device, and which payload is received or presented next. Similarly, a secondary consideration can be configured to determine a length of time for which one payload is presented relative to a length of time for which another payload in the combined payload is presented on the device.

Once one or more primary considerations are satisfied by two or more individual geofences, all applicable secondary considerations are satisfied by the two or more individual geofences, all prohibitions or preferences are satisfied, any optional social media related secondary considerations are computed, and the individual payloads are prioritized or otherwise arranged, an embodiment combines the two or more individual geofences to form the combined geofence. The embodiment also combines the payloads of the individual geofences that are merged to form a combined payload. The embodiment outputs a definition of the combined geofence and the combined payload to a device that is located within the combined geofence. An application executing in the device uses the combined geofence definition to present the combined payload on the device.

The manner of merging payloads in geofence-crowded venues described herein is unavailable in the presently available methods. A method of an embodiment described herein, when implemented to execute on a device or data processing system, comprises substantial advancement of the functionality of that device or data processing system in preventing dropped or lost payloads of individual geofences when the numerosity of the individual geofences in a geofence-crowded environment cannot be adequately handled by a mobile device.

The illustrative embodiments are described with respect to certain types of geofences, geofence definitions, payloads, primary considerations, secondary considerations, social considerations, preferences, prohibitions, logic, analyses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
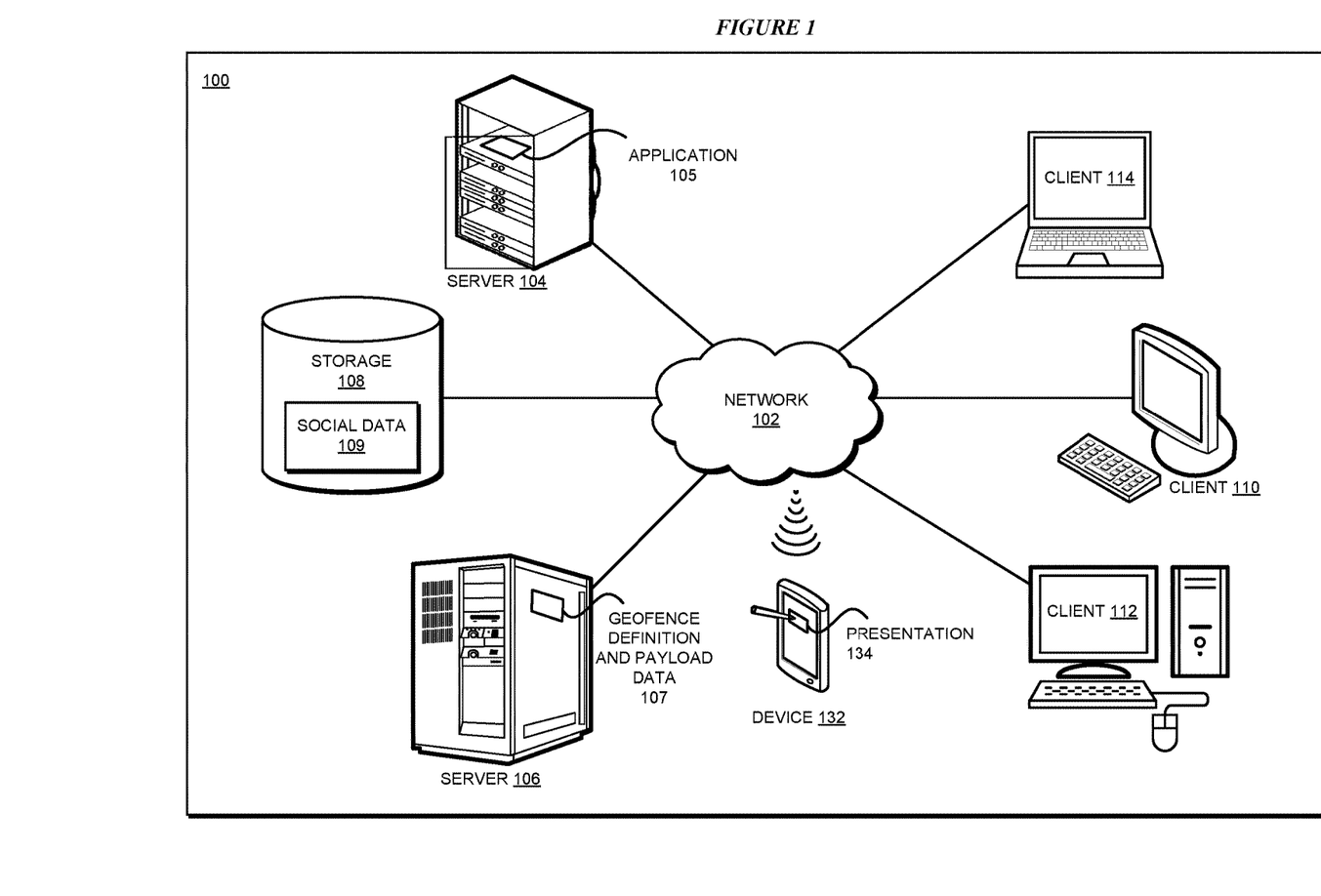
FIG. 1 depicts a block diagram of a network of data processing systems in which illustrative embodiments may be implemented.
Figure 2:
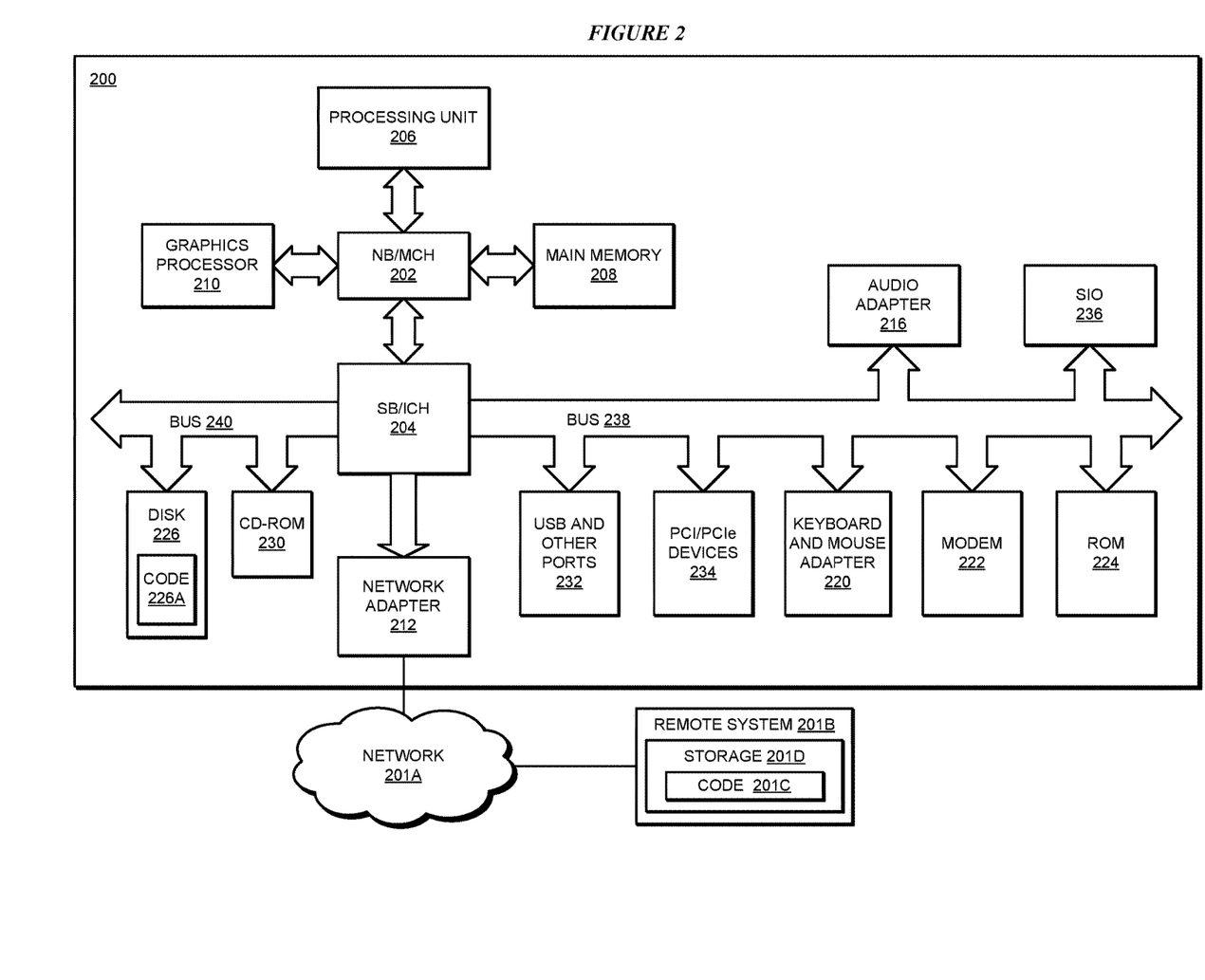
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Server 106 is an example system that operates an individual geofence. Server 106 provides individual geofence definition and the corresponding payload data to application 105 for merging in a manner described herein. Device 132 is a device that travels in an area where one or more geofences are operating. Application 105 provides the definition of a combined geofence and combined payload data to presentation app 134 in device 132 in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS, or Android. An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
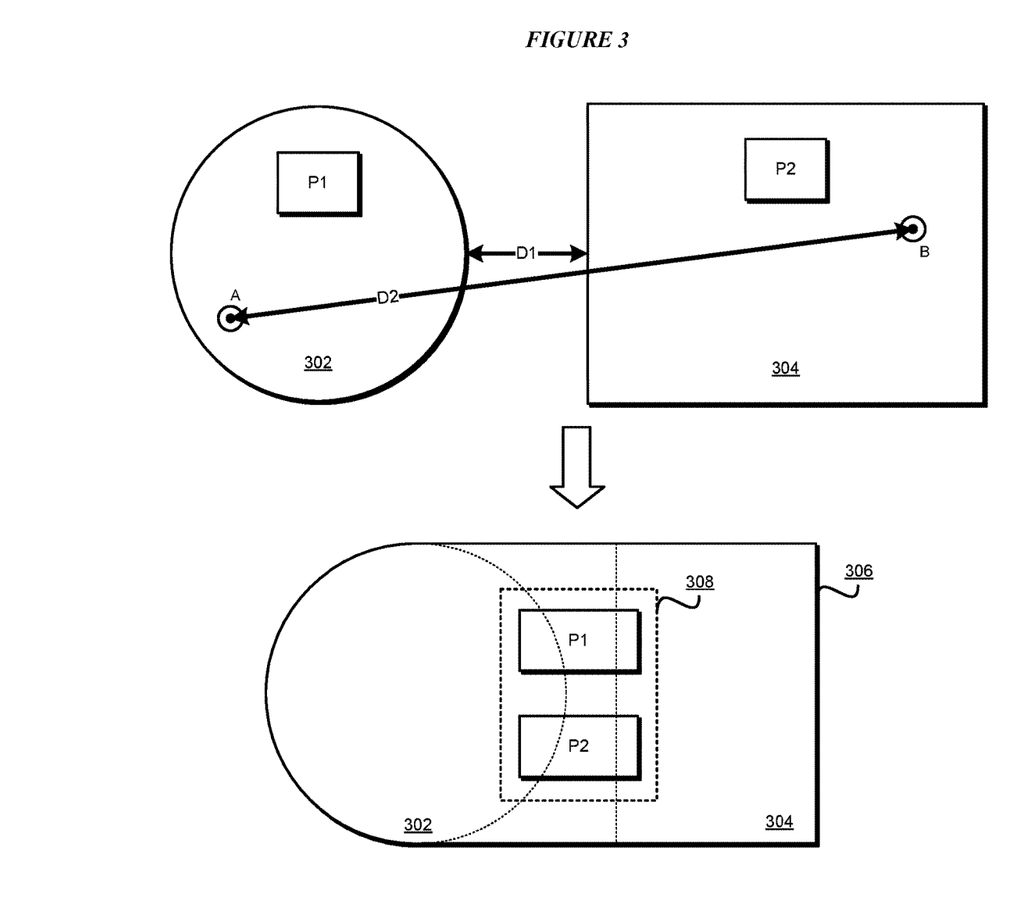
FIG. 3 depicts a block diagram of an example manner of merging payloads in geofence-crowded venues in accordance with an illustrative embodiment.

With reference to FIG. 3, this figure depicts a block diagram of an example manner of merging payloads in geofence-crowded venues in accordance with an illustrative embodiment. Geofence 302 and geofence 304 are each an individual geofence. For example, geofence 302 may be operated by server 106 in FIG. 1, and geofence 304 may be operated by another system comparable to server 106.

Only as an example, geofence 302 is defined as a geometric circle and geofence 304 is defined as a geometric rectangle, both of which are regular geometric shapes. Payload P1 is to be presented to devices that are located within geofence 302, and payload P2 is to be presented to devices that are located inside geofence 304.

For a primary consideration described herein, an embodiment computes a distance between geofences 302 and 304. According to one embodiment, the distance may be D1, which is shown as the shortest distance between any point on geofence 302 and any point on geofence 304. Alternatively, according to another embodiment, the distance may be D2, which is shown as a distance between a store location A in geofence 302 and a store location B in geofence 304.

The operation of an embodiment, such as an embodiment implemented in application 105 in FIG. 1, produces combined geofence 306. Combined geofence 306 merges geofence 302 and 304 as shown and presents combined payload 308 to devices that are located anywhere inside combined geofence 306 or on the boundary of combined geofence 306. Combined payload 308 includes payloads P1 and P2, assuming all primary considerations and secondary considerations have been satisfied by the combinations.

Figure 4:
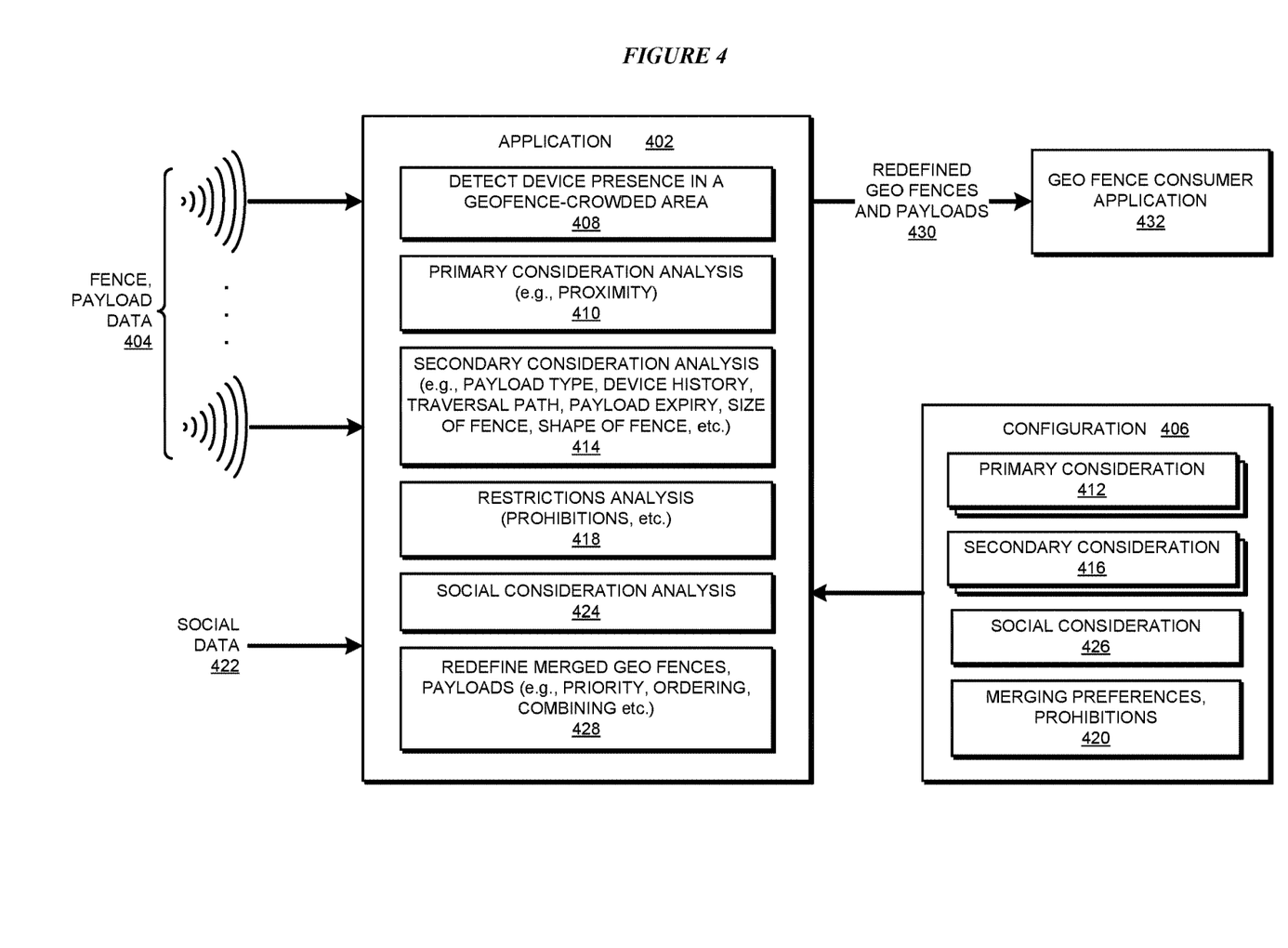
FIG. 4 depicts a block diagram of a configuration for merging payloads in geofence-crowded venues in accordance with an illustrative embodiment.

With reference to FIG. 4, this figure depicts a block diagram of a configuration for merging payloads in geofence-crowded venues in accordance with an illustrative embodiment. Application 402 is an example of application 105 in FIG. 1.

Input 404 is the geofence definition and payload data received from several geofence operator systems, such as data 107 from system 106 in FIG. 1. Configuration 406 can be configured in a system providing input 404, a system where application 402 is executing, a mobile device to which application 402 sends combined geofence definition and combined payload, or using a combination thereof.

Component 408 detects the presence of a mobile device in an area where a set of individual geofences are operating. Component 410 analyzes a specified primary consideration to select a subset of individual geofences for merging in a manner described herein. For example, component 410 uses primary consideration 412 from configuration 406.

For the selected subset of individual geofences that can be merged according to the primary consideration, component 414 analyzes one or more secondary considerations to determine whether the payloads of the subset of individual geofences can also be combined in a manner described herein. As an example, the one or more secondary considerations can be secondary considerations 416 specified in configuration 406.

Component 418 further analyzes one or more preferences and/or prohibitions (generally referred to as restrictions) for the combinability of the individual geofences, payloads, or both. As an example, preference and/or prohibition 420 may be specified in configuration 406 for use with component 418.

Optionally, when a social consideration has to be processed, application 402 receives social data 422 as input from a social media system. Using input 422, component 424 determines whether an individual geofence or a payload should be combined with another individual geofence or payload, respectively, when such a combination should be made, how the combination should be prioritized or ordered, and the like, as described herein. Component 424 may optionally use social consideration 426 specified in configuration 406 for this purpose.

Using the results produced from component 410, 414, 418, and 424, component 428 produces a combined geofence definition and a combined payload to be delivered within the combined geofence. Data 430 of the combined geofence definition and the combined payload is delivered from application 402 to consumer application 432. Consumer application 432 executes on a mobile device, e.g., device 132 of FIG. 1, which is present in the combined geofence, and uses data 430 in presentation 134 in FIG. 1.

Figure 5:
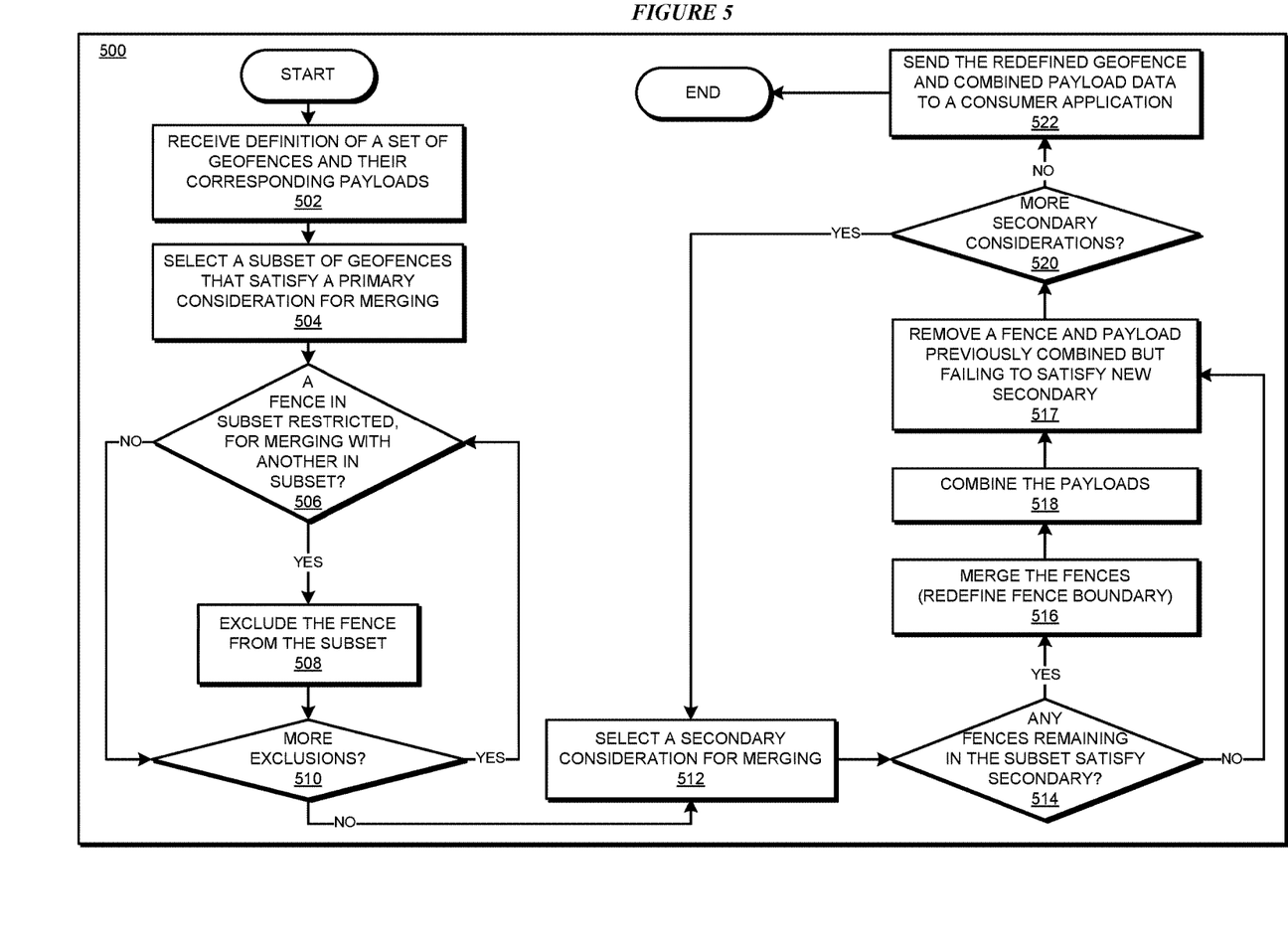
FIG. 5 depicts a flowchart of an example process for merging payloads in geofence-crowded venues in accordance with an illustrative embodiment.

With reference to FIG. 5, this figure depicts a flowchart of an example process for merging payloads in geofence-crowded venues in accordance with an illustrative embodiment. Process 500 can be implemented in application 402 in FIG. 4.

The application receives a set of geofence definitions and their corresponding payloads (block 502). The set of geofences are operating in an area where geofence-crowding is occurring and where a device is situated so as to be able to present the payloads of at least some of the geofences in the set.

The application selects a subset of the geofences that satisfy a primary consideration, such as less than a threshold distance separation from another geofence in the set (block 504). The application determines whether a geofence in the subset has a restriction, or is excluded, from merging with another geofence in the subset (block 506). If an exclusion is defined for the geofence ("Yes" path of block 506), the geofence is excluded from the subset (block 508). The application determines if more exclusions are to be evaluated for other geofences in the subset (block 510). If an exclusion is not defined or not applicable for the geofence ("No" path of block 506), the application proceeds to block 510.

If more exclusions are to be processed for another geofence in the subset ("Yes" path of block 510), the application returns to block 506. If no more exclusions are to be processed for another geofence in the subset ("Yes" path of block 510), the application selects a secondary consideration for the merging (block 512).

The application determines whether any geofences remaining in the subset, and/or their payloads satisfy the secondary consideration (block 514). If any geofences and their payloads satisfy the secondary consideration, the application merges those geofences (block 516). For the geofences that are merged, the application also combines their payloads (block 518). The application proceeds to block 520 thereafter.

If a geofence or its payload fail to satisfy the selected secondary consideration ("No" path of block 514), the application removes that geofence and its payload from any combination previously created where that geofence and its payload participate (block 517). The application then proceeds to block 520.

The application determines whether more secondary considerations are to be processed in a similar manner (block 520). If more secondary considerations are to be processed ("Yes" path of block 520), the application returns to block 512 and selects another secondary consideration. if no more secondary considerations are to be processed ("No" path of block 520), the application sends the redefined definition of the combined geofence and the combined payload to a consumer application in the mobile device (block 522). The application ends process 500 thereafter. Alternatively, the application continues to monitor (not shown) the device's movements, and combines new of different geofences and payloads as the location of the device changes in the manner of process 500.

Thus, a computer implemented method, system or apparatus, and computer program product are provided in the illustrative embodiments for merging payloads in geofence-crowded venues and other related features, functions, or operations. Where an embodiment or a portion thereof is described with respect to a type of device, the computer implemented method, system or apparatus, or the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   detecting that a mobile device is located in an area to receive payloads corresponding to a first geofence and a second geofence from a set of geofences operating in the area;
   forming a combined geofence definition, responsive to a first payload of the first geofence in the set of geofences and a second payload of the second geofence in the set of geofences, by combining a first definition of the first geofence with a second definition of the second geofence;
   combining, using a processor and a memory at a data processing system, the data processing system being distinct from a mobile device traveling in the area, and responsive to the forming the combined geofence definition, the first payload with the second payload to form a combined payload; and
   transmitting, to the mobile device the combined geofence definition and the combined payload.

2. The method of claim 1, further comprising:
   changing an order in which the first payload is combined with the second payload, the changing being responsive to a second secondary consideration.

3. The method of claim 1, further comprising:
   selecting, responsive to a social networking consideration, the second payload for combining with the first payload, wherein the selecting the second payload is responsive to a social network data indicating a previous use of the second payload by a member of a social network of a user of the mobile device.

4. The method of claim 3, further comprising:
   causing, responsive to the social networking consideration, the second payload to be presented at a higher priority than the first payload at the mobile device.

5. The method of claim 1, wherein the secondary consideration restricts a type of payloads that can be combined with each other, and wherein the first payload and the second payload are of the type.

6. The method of claim 1, wherein the secondary consideration specifies that payloads to be combined have at least a threshold period left before expiry, wherein the first payload has at least the threshold period left before the first payload expires, and wherein the second payload has at least the threshold period left before the second payload expires.

7. The method of claim 1, wherein the secondary consideration specifies that geofences to be combined have areas of sizes within a tolerance value of each other, wherein the first geofence has a first area that is within the threshold value of a second area of the second geofence.

8. The method of claim 1, further comprising:
   computing a projected travel path of the mobile device through the area, wherein the secondary consideration specifies that each geofence to be combined into the combined geofence be on the projected travel path, and wherein the first geofence and the second geofence are each on the projected travel path.

9. The method of claim 1, further comprising:
   computing a location of a pause during a past travel of the mobile device through the area, wherein the secondary consideration specifies that each geofence to be combined into the combined geofence be within a threshold distance from the location of the pause, and wherein the first geofence and the second geofence are each within a threshold distance from the location of the pause.

10. The method of claim 1, further comprising:
    excluding from the combined geofence definition a third geofence responsive to a third payload of the third geofence failing to satisfy a secondary consideration, wherein the secondary consideration applies to a combination of the first payload with the third payload.

11. The method of claim 1, wherein the combined geofence definition includes a first area of the first geofence, a second area of the second geofence, and a third area not covered by the first geofence and the second geofence.

12. The method of claim 1, further comprising:
    excluding from the combined geofence definition, a third geofence, wherein the third geofence is restricted from merging with the first geofence.

13. The method of claim 1, wherein the first geofence satisfies a primary consideration relative to the second geofence, wherein the primary consideration comprises a proximity distance, wherein proximity distance is a shortest distance between any point in the first geofence and any point in the second geofence.

14. The method of claim 1, wherein the first geofence satisfies a primary consideration relative to the second geofence, wherein the primary consideration comprises a proximity distance, wherein proximity distance is a distance between a designated point in the first geofence and a designated point in the second geofence.

15. The method of claim 1, further comprising:
    detecting that the mobile device is located in the area to receive payloads corresponding to each geofence in the set of geofences.

16. A computer usable program product comprising one or more computer-readable storage devices, and program instructions stored on at least one of the one or more storage devices, the stored program instructions comprising:
- program instructions to detect that a mobile device is located in an area to receive payloads corresponding to a first geofence and a second geofence from a set of geofences operating in the area;
- program instructions to form a combined geofence definition, responsive to a first payload of the first geofence in the set of geofences and a second payload of the second geofence in the set of geofences, by combining a first definition of the first geofence with a second definition of the second geofence;
- program instructions to combine, using a processor and a memory at a data processing system, the data processing system being distinct from a mobile device traveling in the area, and responsive to the forming the combined geofence definition, the first payload with the second payload to form a combined payload; and
- program instructions to transmit, to the mobile device the combined geofence definition and the combined payload.

17. The computer usable program product of claim 16, further comprising:
- program instructions to change an order in which the first payload is combined with the second payload, the changing being responsive to a second secondary consideration.

18. The computer usable program product of claim 16, wherein the computer usable code is stored in a computer readable storage device in a data processing system, and wherein the computer usable code is transferred over a network from a remote data processing system.

19. The computer usable program product of claim 16, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
- program instructions to detect that a mobile device is located in an area to receive payloads corresponding to a first geofence and a second geofence from a set of geofences operating in the area;
- program instructions to form a combined geofence definition, responsive to a first payload of the first geofence in the set of geofences and a second payload of the second geofence in the set of geofences, by combining a first definition of the first geofence with a second definition of the second geofence;
- program instructions to combine, the computer system being distinct from a mobile device traveling in the area, and responsive to the forming the combined geofence definition, the first payload with the second payload to form a combined payload; and
- program instructions to transmit, to the mobile device the combined geofence definition and the combined payload.

* * * * *